United States Patent [19]

Adler

[11] Patent Number: 5,072,655

[45] Date of Patent: Dec. 17, 1991

[54] PISTONS FOR AXIAL PISTON MACHINES

[75] Inventor: Bernhard Adler, Thalfingen, Fed. Rep. of Germany

[73] Assignee: Hydromatik GmbH, Fed. Rep. of Germany

[21] Appl. No.: 307,262

[22] Filed: Feb. 6, 1989

[30] Foreign Application Priority Data

Feb. 12, 1988 [DE] Fed. Rep. of Germany ....... 3804424

[51] Int. Cl.[5] .......................... F04B 21/04; F04B 1/12; F16J 1/00

[52] U.S. Cl. .......................................... 92/160; 92/158; 92/172; 92/181 R; 403/274; 403/284; 29/517; 29/888.042

[58] Field of Search ................. 91/488; 92/57, 66, 70, 92/71, 158-160, 181 R, 182, 184, 172; 29/156.5 R, 517, 516, 888.04, 888.042, 888.044, 888.051; 403/274, 284, 285

[56] References Cited

U.S. PATENT DOCUMENTS

| | | | |
|---|---|---|---|
| 1,169,642 | 1/1916 | Heeter et al. | 403/274 X |
| 1,291,388 | 1/1919 | Bright et al. | 29/517 |
| 1,322,250 | 11/1919 | Lewis | 29/517 |
| 1,703,037 | 2/1929 | Heck | 29/516 X |
| 1,797,691 | 3/1931 | Merrill | 403/274 X |
| 1,995,616 | 3/1935 | Kamack | 29/517 |
| 3,068,563 | 12/1962 | Reverman | 29/517 X |
| 3,142,262 | 7/1964 | Firth et al. | 91/488 X |
| 3,187,644 | 6/1965 | Ricketts | 92/57 X |
| 3,633,467 | 1/1972 | Watanabe et al. | 91/488 X |
| 3,689,112 | 9/1972 | Slator et al. | 29/516 X |
| 3,741,077 | 6/1973 | Hulsebus et al. | 92/158 X |
| 3,896,707 | 7/1975 | Holmstrom | 92/172 |
| 3,930,437 | 1/1976 | Guntert | 92/160 |
| 3,984,904 | 10/1976 | Schlecht | 92/172 X |
| 4,519,300 | 5/1985 | Adomis et al. | 92/158 |
| 4,546,692 | 10/1985 | Lotter et al. | 92/159 X |
| 4,791,712 | 12/1988 | Wells et al. | 403/285 X |

FOREIGN PATENT DOCUMENTS

| | | | |
|---|---|---|---|
| 1920140 | 9/1970 | Fed. Rep. of Germany . | |
| 1381271 | 3/1971 | Fed. Rep. of Germany . | |
| 2428017 | 1/1975 | Fed. Rep. of Germany . | |
| 71402 | 6/1979 | Japan | 92/172 |
| 407679 | 9/1966 | Switzerland | 403/274 |
| 343967 | 2/1931 | United Kingdom | 29/516 |

*Primary Examiner*—Edward K. Look
*Assistant Examiner*—George Kapsalas
*Attorney, Agent, or Firm*—Scully, Scott, Murphy & Presser

[57] ABSTRACT

A piston for an axial piston machine, comprising a hollow body having an axial cavity into which a filler piece of a material of lower specific gravity than the material of the piston is inserted which at least partially fills said cavity, said filler piece being secured axially in the cavity by a shoulder projecting radially inwards from the hollow body, is to be designed so that with simple construction a stable axial securing of the filler piece is ensured. This is achieved in that the filler piece has a recess arranged between its ends on its outer surface into which the section of the hollow body overlapping the recess is pressed in a form fitting and force locking manner.

22 Claims, 2 Drawing Sheets

PISTONS FOR AXIAL PISTON MACHINES

BACKGROUND OF THE INVENTION

1. Field of the Invention

This invention relates to a piston for an axial piston machine, including a body forming an axial cavity, and a piece of filler material inserted into that cavity.

2. Description of the Prior Art

Such a piston, generally known as a slipper piston, is described and illustrated in DE-OS 19 20 140. In this known arrangement the core or filler body is screwed into the cavity in the piston. The inner and outer threads for this are at the inner end of the cavity or of the filler piece. A shoulder in the hollow body which engages in front of the outer end of the filler piece serves to axially secure the filler piece in the cavity. This shoulder is formed by a lock ring inserted in a groove in the wall of the cavity, and arranged between this lock ring and the outer end of the filler piece is a spring washer which urges the filler piece towards the bottom of the cavity. By this means the filler piece is axially secured on the one hand by the bottom of the cavity and on the other hand by the shoulder. It should be noted that the engagement of the thread cannot ensure axial securing of this kind because, owing to the play in the thread, the abrupt pressure and centrifugal force loading when the piston is in operation would deform the screw thread and considerably increase the play in the screw thread, which would necessarily lead to loosening of the filler piece.

In the above-mentioned known arrangement the axial securing is thus determined by the strength of the spring washer. If, when the piston is in operation, the forces acting on the filler piece and directed against the spring tension exceed the spring tension, rattleproof fastening of the filler piece in the piston is no longer guaranteed. It must also be taken into consideration that in the known arrangement the lock ring can wear its seat out or it could also be split. It is thus clear that in the known arrangement the axial securing is relatively insecure. In addition it has many component parts through which the manufacturing costs of the piston are increased.

SUMMARY OF THE INVENTION

It is the object of the invention to design a piston of the kind described in the introduction so that with a simple and economical manner of construction stable axial securing of the filler piece is ensured.

In the arrangements according to the invention the filler piece is secured by at least one projection formed, after it has been inserted, by pressure from the outside on the hollow body (hereinafter termed an indentation) which engages in a form-fitting manner in a recess and in doing so can fill the recess partially or completely. The indentation according to the invention leads to stable securing without play, since on the one hand it is an integral part of the hollow body and by means of the direct engagement in the recess ensures axial securing of the filler piece without play, and on the other hand provides a solid securing element. Furthermore the indentation has a radial or axial clamping effect on the filler piece through the latter is held securely. While in one embodiment, the indentation is pressed into a recess made in the filler piece before it is inserted, in an alternate embodiment on the other hand two axially juxtaposed indentations are provided which, without previously forming a recess in the filler piece, are pressed into the hollow body and into the filler piece by deforming both parts: in this case a recess is also pressed into the filler piece into which the indentation is squeezed. Owing to the juxtaposed arrangement of the indentations there is an opposing compressive strain of the material of the filler piece between them, through which radial and axial clamping of the filler piece between the indentations is achieved, which even after taking the expected thermal expansion of the materials into consideration leads to stable fastening.

The no-play axial securing attainable by means of the invention can be achieved both when the indentation presses against both sides or flanks of the recess and when the filler piece presses against the bottom or against the shoulder of the cavity and the indentation only presses against the side or flank of the recess facing the bottom or shoulder of the cavity. In both cases stable axial securing is obtained which is effective in both axial directions, and in the first case the filler piece does not need to fit against the bottom of the cavity or against the shoulder.

Good contact of the indentation with the at least one flank or side of the recess is possible because, owing to the deformability of the material of the filler piece, the indentation can be pressed into the material of the filler piece relatively easily, so that not only are large contact surfaces obtained but also, when taking into consideration the elasticity of the material, a snug contact having low surface pressure is obtained.

Moreover, the design of the invention makes it possible for the material of the filler piece being deformed in the course of the indentation process to flow into the free space arising between the indentation and the bottom of the recess.

An alternate disclosed arrangement, which necessarily results in a deformation of the sides or flanks of the recess, also leads to the afore-mentioned advantages.

Further, the arrangements result in the filler piece being urged axially towards the bottom of the cavity or a shoulder replacing it, giving a snug fitting or prestressing of the filler piece on the bottom of the cavity and thus resulting in an additionally effective axial securing. A piston of this kind is particularly suitable for use at very high pressures.

Within the scope of the invention it is possible to provide one or more indentations which can be arranged both axially side by side and distributed around the circumference of the piston. For example, an annular form of indentation is provided, resulting in a large cross-section and thus a large securing cross-section for the indentation. An arrangement of this kind can be realised simply, economically and without substantial distortion of the piston, preferably by a rolling operation.

By means of an arrangement disclosed herein, the air-venting problem when indenting into the recess is solved.

Additional disclosed features make advantageous lubrication of the piston possible by making use of the depression or depressions on the outer circumference of the piston arising when pressing or rolling-in of the indentation.

With one disclosed embodiment, a particularly stable, axial securing for the filler piece is obtained because a depression or constriction on the exterior, which might weaken the hollow body, does not arise.

Also disclosed is an arrangement in which, cavitation damage to the free front end of the filler piece when the pistons are in operation is prevented.

BRIEF DESCRIPTION OF THE DRAWINGS

The invention will now be described in more detail with reference to preferred exemplary embodiments shown in the drawings, in which.

DETAILED DESCRIPTION OF PREFERRED EMBODIMENTS

Figure 1:
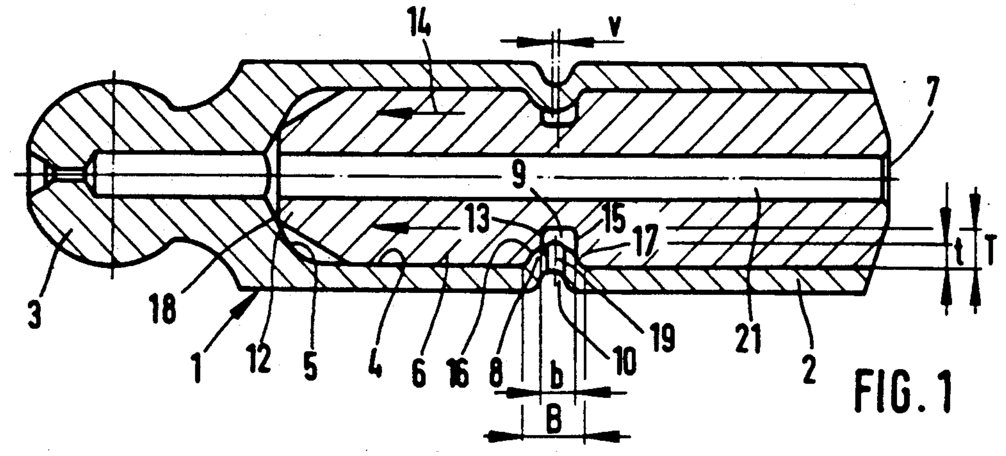
FIG. 1 shows a piston for axial piston machines designed according to the invention, in axial section.

The pistons indicated generally by 1 in the drawings each comprise a piston shaft 2 and a spherical piston head 3. Extending from its free end 4 in the piston shaft 2 of circular cross-section is a blind cavity 4 whose bottom is indicated by 5. The piston shaft 2 is thus a hollow body. Inserted into the cavity 4 is a filler piece which substantially fills the cavity 4, fits against the bottom 5 of the cavity 4 and extends substantially up to the free end of the piston 1 indicated by 7. The filler piece 6 comprises a material having a lower specific gravity than the material of the hollow body 2, through which it is possible to reduce the weight or mass of the piston considerably. In the exemplary embodiments to be described the filler piece 6 consists of an aluminium alloy.

In order to axially secure the annular filler piece 6, inserted into the likewise annular cavity 4 with as little play as possible, e.g. by pressing or with only a marginal tolerance, at least one indentation 8 is provided, formed between the ends of the filler piece 6, after it has been inserted, by radial pressure from the outside on the hollow body or piston shaft 2, which engages or is pressed into a recess made in the filler piece 6 before insertion of the filler piece 6. In the exemplary embodiments to be described the indentation 8 and the recess 9 each extend around the entire circumference of the piston shaft 2, the recess 9 being an annular groove and the indentation 8 being made by rolling. The material is pressed or rolled into the recess 9 by a wheel having a rounded or wedge-shaped circumferential surface by relative movement in the circumferential direction between the wheel and the hollow body 2 and by radial pressure. The pressed or rolled indentation 8 is preferably pressed in by a rounded tool so that on the outer circumference of the piston shaft 2 a rounded depression 10 or groove is formed and the indentation 8 is also rounded on the inside.

By this means a notch effect is avoided which could impair the strength of the piston shaft 2.

The indentation is preferably displaced relative to the recess 9 by an amount v towards the inner end 12 of the filler piece 6 or towards the bottom 5 of the cavity 4 which can clearly be seen at the displacement v between the transverse middle axes of the indentation 8 and the recess 9, namely an amount that is smaller than half the width B of the indentation 8. This arrangement leads to a substantially larger deformation of the relatively soft or deformable material of the filler piece 6 in the region of the flank 13 of the recess 9 facing the bottom 5 of the cavity 4, by means of which an axial force, indicated by the arrows 14, is transmitted to the filler piece 6 and presses the filler piece 6 against the bottom 5 of the cavity 4. It is advantageous to make the arrangement such that the material of the filler piece 6 is also deformed or pressed away at the flank 15 of the recess 9 facing away from the bottom 5 of the cavity 4, so that with regard to the axial securing of the filler piece 6 there are points of contact indicated by 16 to 18 between the filler piece 6 and the indentation 8 and the bottom 5. While the contact point 16 prevents the filler piece 6 from moving out of the cavity 4 the contact points 17 and 18 prevent further penetration. Owing to the prestressing produced by the forces 14 the filler piece 6 fits flush against the bottom 5 so that even when using the piston 1 under high pressures and when taking the centrifugal forces generated by the reciprocating movement of the piston 1 into consideration there is firm axial securing of the filler piece 6. Since the width B of the indentation 8 is larger than the width b of the recess 9 or annular groove, contact surfaces large enough to keep the contact pressure within permissible limits are obtained, preferably on both flanks 13, 15.

The depth T of the recess 9 or the annular groove is preferably greater than the depth t of the pressed or rolled indentation 8 so that there is a free space between the bottom of the recess 9 and the indentation 8 into which the material of the filler piece 6 deformed on the flanks 15, 17 can be pressed or can flow.

In the present exemplary embodiment only one annular indentation 8 is provided in about the centre of the piston shaft 2. It is also possible, within the scope of the invention, to arrange a plurality of indentations 8 one behind the other in the longitudinal direction.

In order to make it possible during the indentation for air present in the recess 9 to escape easily, the piston shaft 2 has a radial hole 19 at a point where the indentation 8 is to be made which, when the filler piece 6 is inserted, opens into its recess 9. During the indentation the air can escape through this hole 19.

Figure 2:
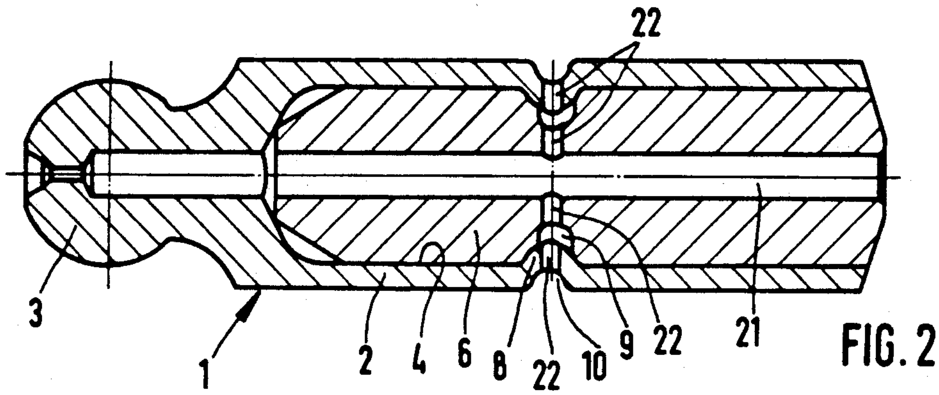
FIG. 2 is an axial cross-sectional view of an alternate piston according to the invention.

In all exemplary embodiments an axial lubricating bore 21 is provided which extends longitudinally through the filler piece 6 and the piston head 3. In this connection it is important, as shown in FIG. 2, that at least one, preferably two or more, diametrical or star-shaped radially opposed lubricating bores 22 start from this lubricating bore 21 in the filler piece 6 and in the piston shaft 2 and extend through the recess 9 or annular groove into the depression indicated by 10 on the outer circumference of the piston shaft 2. By this means an advantageous lubricating arrangement for the exterior of the piston shaft 2 is provided. When the axial lubricating bore 21 is present it is sufficient for the purpose of air-venting the recess 9 during rolling if there is at least one section of the lubricating bore 22, extending in the filler piece 6, since in this case the air found in the recess 9 can escape inwards during indentation.

Figure 3:
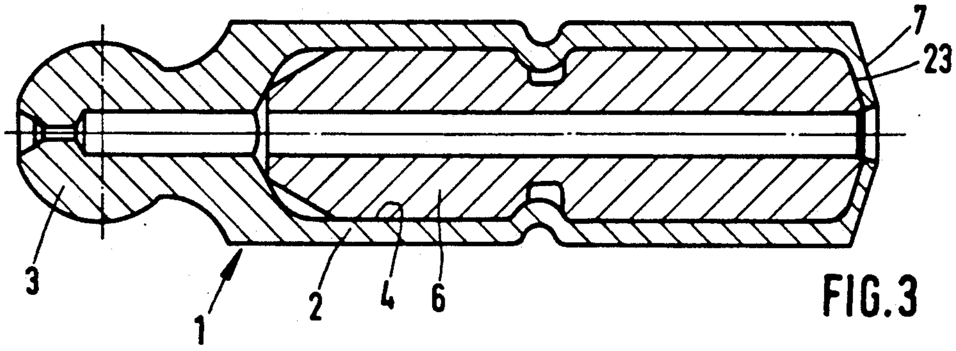
FIG. 3 is an axial cross-sectional view of a third embodiment of a piston according to this invention.

In the exemplary embodiment shown in FIG. 3 the piston shaft 2 has at its free end 7 a front wall 23 extending radially inwards which bears against the front face of the filler piece 6 facing it. The front wall 23 forms a protective shield for this front face of the filler piece 6 as it consists of the harder and more wear-resistant material of the piston 1. By this means cavitation damage to the front face of the filler piece 6 is prevented when the piston 1 is in use.

The front face 23 is preferably an integral, rolled in part of the piston shaft, for which purpose the wall of the hollow body of the piston shaft 2 should be made correspondingly longer than the length of the filler body 6.

Figure 4:
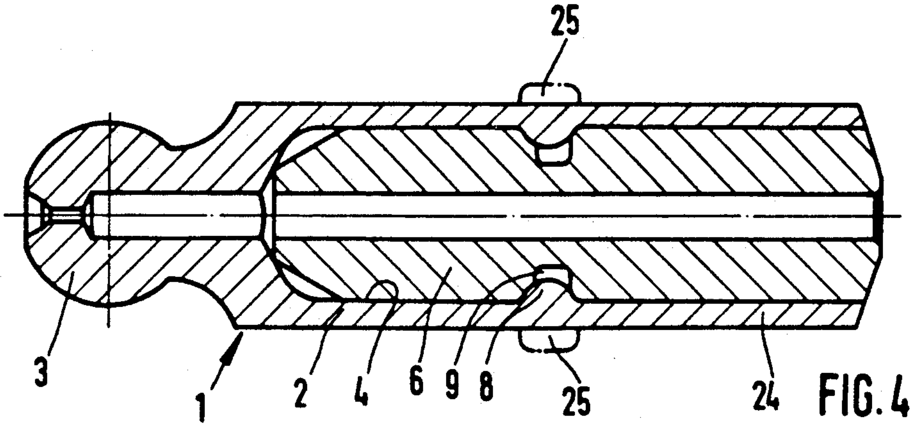
FIG. 4 is an axial cross-sectional view of a fourth embodiment of a piston according to the present invention.

In the exemplary embodiment shown in FIG. 4 there is no depression 10 on the outer circumference of the piston shaft 2 although an indentation 8 has been pressed or rolled-in. This is achieved by using a piston shaft 2 having a thicker cylindrical wall 24 and eliminating the depression 10 after pressing or rolling-in by machining the outer surface of the piston shaft 2 (turning in a lathe, grinding).

It is also possible to provide, at the point at which the indentation is to be pressed or rolled-in, a material attachment indicated generally in FIG. 4 by 25, in this case an annular material attachment whose cross-sectional size is such that it substantially corresponds to the cross-section of the indentation 8. In an embodiment such as this a more stable indentation 8 is obtained since the depression 10 or constriction is not formed, as the material attachment 25 fills such a depression 10. If after pressing-in a residue of the material attachment 25 projects on the circumference of the piston shaft 2 it can be ground off.

Figure 5:
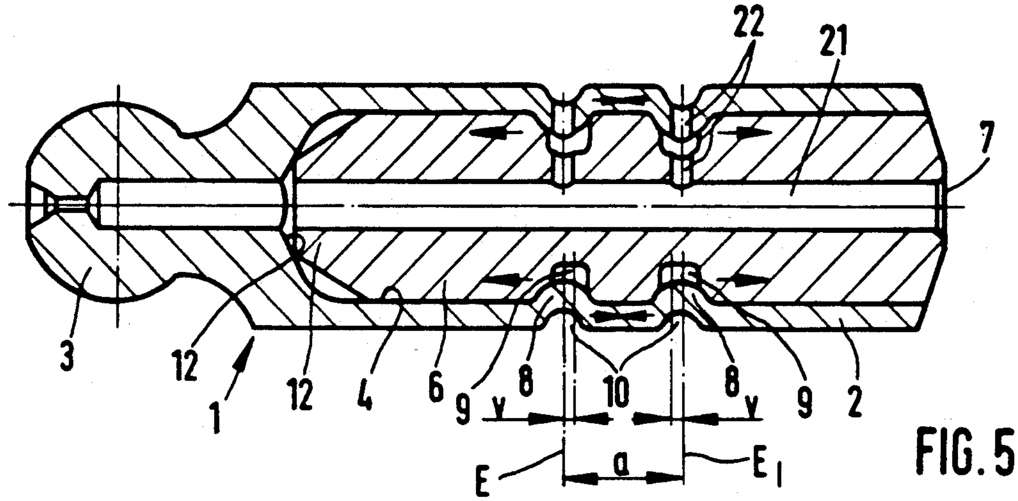
FIG. 5 is an axial cross-sectional view of a fifth embodiment of a piston according to this invention and in which the piston is provided with two axially spaced indented sections.

The exemplary embodiment shown in FIG. 5 is based on the embodiment shown in FIG. 1, but in this case two annular indentations 8 are provided at an axial distance a from one another, i.e. they lie in two cross-sectional planes E and $E_1$. The arrangement is such that each indentation 8 is offset, by an amount v relative to an associated annular recesses 9 and moreover, these indentations are offset in opposite directions, i.e. towards the opposite ends of the filler piece 6, relative to the recesses 9. Owing to this arrangement pressure points are formed on the sides or flanks of the recesses 9 facing away from one another so that in the region of these flanks more material at the filler piece 6 is displaced when pressing-in than at the sides or flanks of the recesses 9 facing one another. Therefore in the region between the recesses 9 or the indentations 8 a tensile stress is produced in the filler piece 6 and compressive stress in the hollow body 2. The forces are indicated by arrows. Within the scope of the invention it is also possible to offset the indentations 8 inversely relative to the recesses 9, i.e. inwardly, so that between the recesses or the indentations a compressive stress is produced in the filler piece 6 and a tensile stress in the hollow body 2. The embodiment to be used depends on the one hand on the physical properties and on the other hand on the thermal expansion coefficients of the materials used for the filler piece 6 and the hollow body 2. When using an aluminium alloy as the material for the filler piece 6 the first described embodiment shown in FIG. 5 is particularly suitable.

Figure 6:
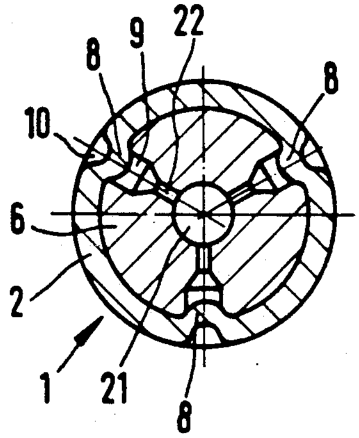
FIG. 6 is a transverse cross-sectional view of a piston according to a sixth embodiment of this invention, and in which the piston is provided with three circumferentially spaced indented sections.

In the embodiment shown in FIG. 6, instead of annular recesses and annular indentations, local indentations 8, preferably of circular cross-section, are provided, namely three indentations distributed uniformly on the circumference in a cross-sectional plane. The recesses 9 in this case comprise blind bores into which the indentations 8 are pressed, material from the filler piece 6 being pressed in at the edge of the bore. A lubricating passage 21 is also provided in this embodiment. Here too it is advantageous to provide a respective radial vent passage 22 either between the lubricating passage 21 and the recesses 9 or between the latter and the depressions 10 formed by pressing-in.

Figure 7:
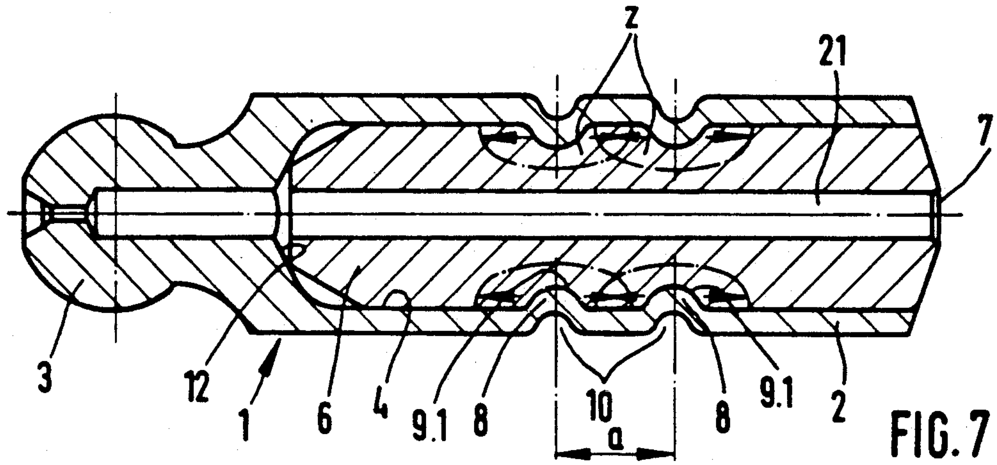
FIG. 7 is an axial cross-sectional view of a seventh embodiment of this invention, in which the piston body and the filler material are simultaneously deformed.

The exemplary embodiment shown in FIG. 7 differs from the embodiments already described essentially in that indentations are provided that are not rolled into recesses in the filler piece 6 but into the solid material of the filler piece. In this manner, owing to the deformation of the material, recesses are also formed in the filler piece which are indicated by 9.1 and into which the indentations 8 engage, but these recesses 9.1 are not made on the filler piece 6 before the indentation. Moreover, two indentations 8 are likewise arranged at an axial distance a from one another. The distance a should be chosen, by taking the properties of the material into consideration, such that owing to the opposed compressive strain in the filler piece 6 in the region between the indentations 8 an increased compressive stress is produced in this region in the filler piece 6, as shown by arrows. In other words, the distance a is to be made large enough, having regard to the material, for the zones z deformed by the indentation and thereby compressed or consolidated, to merge at least partly into one another. This is also true of the exemplary embodiments described above in which recesses 9 are made in the filler piece 6 before indentation. A tensile stress can thereby arise in the wall of the hollow body 2. Owing to this compressive stress there is an additional axial stress acting in addition to the radial and axial clamping force in the region of the indentations 8, which contributes to stable fastening of the filler piece 6 in the hollow body 2. A comparable effect is also achieved if, in the embodiment shown in FIG. 7, the indentations 8 comprise local indentations as shown in FIG. 6.

In all exemplary embodiments it can be advantageous to give the hollow body subsequent treatment, preferably by grinding, in particular in the region of the indentation.

What is claimed is:

1. A piston for an axial piston machine, comprising:
- a piston body forming an axial cavity, and having a given specific gravity; and
- a filler material inserted into and at least partially filling said cavity, and having a specific gravity less than said given specific gravity;
- the filler material including
  - i) inner and outer opposite axial ends,
  - ii) an annular surface extending between said ends, and
  - iii) a recess extending inward from said annular surface at a location between said axial ends;
- the piston body including
  - i) a tubular sidewall,
  - ii) a radially extending surface extending inward from the sidewall, and
  - iii) an indented section connected to and radially extending inward from the sidewall, the indented section being pressed into the recess of the filler material to fit in said recess in pressure engagement against filler material to hold said filler material axially in place in the cavity of the piston body.

2. A piston according to claim 1 wherein the filler material comprises a material that is softer or more deformable than the material of the hollow body.

3. A piston according to claim 2 wherein the material of said filler piece is an aluminium alloy.

4. A piston according to claim 1 wherein the recess and the indented section each have a respective radial depth. and the radial depth of the recess is larger than the radial depth of the indented section.

5. A piston according to claim 4 wherein the recess and the indented section each have a respective axial width; and the axial width of the recess before the indented section is pressed thereinto, is greater than the axial width of the indented section.

6. A piston according to claim 1 wherein the recess and indented section each have a circular cross-section.

7. A piston according to claim 1 wherein the recess annularly extends completely around the annular surface of the filler material.

8. A piston according to claim 7 wherein the indented section annularly extends completely around the tubular sidewall.

9. A piston according to claim 1, wherein:

said recess comprises a first recess, and said indented section comprises a first indented section;

the filler material further includes a second recess extending inward from the annular surface of the filler material, at a location between the axial ends thereof; and the piston body further includes a second indented section connected to and radially extending inward from the sidewall, the second indented section being pressed into the second recess in pressure engagement against the filler material to help hold the filler material axially in place in the cavity of the piston body.

10. A piston according to claim 9, wherein the first and second recesses are diametrically opposite each other and the first and second indented sections are diametrically opposite each other.

11. A piston according to claim 9, wherein:

the filler material further includes a third recess extending inward from the annular surface of the filler material, at a location between the axial ends thereof; and the piston body further includes a third indented section connected to and radially extending inward from the sidewall, the third indented section being pressed into the third recess in pressure engagement against the filler material to help hold the filler material axially in the cavity of the piston body;

the first, second, and third recesses are equally spaced apart around the annular surface of the filler material; and the first, second, and third indented sections are equally spaced apart around the tubular sidewall.

12. A piston according to claim 1, wherein:

the tubular sidewall has an approximately uniform exterior surface radius; and the tubular sidewall includes a material portion located immediately outside the indented section, said material portion having a size and shape such that after the indented section is pressed inward, the tubular sidewall has said uniform exterior surface radius in an area adjacent said indented section.

13. A piston according to claim 1, wherein the piston body further includes an endwall section extending radially inward from the tubular sidewall and at least substantially covering the outer axial end of the filler material.

14. A piston for an axial piston machine, comprising:

a piston body forming an axial cavity, and having a given specific gravity; and a filler material inserted into and at least partially filling said cavity, and having a specific gravity less than said given specific gravity;

the filler material including i) first and second opposite axial ends, and ii) an annular surface extending between said ends;

the piston body including i) a tubular sidewall, and ii) a radially extending surface extending inward from the sidewall;

wherein first and second axially spaced apart portions of the tubular sidewall are pressed inward, from outside said sidewall, to deform both the tubular sidewall and the filler material, and to form recesses in the filler material and indented sections in a tubular sidewall, with said indented sections extending into said recesses to secure the filler material axially in the cavity of the piston body.

15. A piston according to claim 14 wherein the indented sections of the tubular sidewall are formed by rolling a tool around said sidewall.

16. A piston according to claim 14 wherein the first and second portions of the tubular sidewall are axially spaced apart.

17. A piston according to claim 16 wherein the indented sections are mutually displaced relative to the recesses.

18. A piston for an axial piston machine, comprising:

a piston body defining a piston axis, forming an axial cavity, and having a given specific gravity; and a filler material inserted into and at least partially filling said cavity, and having a specific gravity less than said given specific gravity;

the filler material including i) inner and outer opposite axial ends, ii) an annular surface extending between said ends, and iii) a recess extending inward from said annular surface at a location between said axial ends;

the piston body including i) a tubular sidewall, ii) a radially extending surface extending inward from the sidewall, and iii) an indented section connected to and radially extending inward from the sidewall, the indented section being pressed into the recess of the filler material to fit in said recess in pressure engagement against the filler material to hold the filler material in the cavity of the piston body;

wherein the recess has a given axial length, and a first transverse plane extends perpendicular to the piston axis, midway along said given axial length; and the indented section has a selected axial length, and a second transverse plane extends perpendicular to the piston axis, midway along said selected axial length; and wherein the second transverse plane is axially offset relative to the first transverse plane, toward said radially extending surface, and the indented section forces the filler material axially against said radially extending surface to help hold the filler material in the cavity of the piston body.

19. A piston according to claim 18, wherein the radially extending surface comprises a bottom surface of the axial cavity.

20. A piston according to claim 18, wherein the radially extending surface comprises an inner shoulder of the piston body.

21. A piston for an axial piston machine, comprising:
a piston body forming an axial cavity, and having a given specific gravity; and
a filler material inserted into and at least partially filling said cavity, and having a specific gravity less than said given specific gravity;
the filler material including
i) inner and outer opposite axial ends,
ii) an annular surface extending between said ends, and
iii) a recess extending inward from said annular surface at a location between said axial ends;
the piston body including
i) a tubular sidewall,
ii) a radially extending surface extending inward from the sidewall, and
iii) an indented section connected to and radially extending inward from the sidewall, the indented section being pressed into the recess of the filler material to fit in said recess in pressure engagement against the filler material to hold the filler material in the cavity of the piston body;
wherein the tubular sidewall forms a vent opening extending through said sidewall and in fluid communication with the recess to vent air therefrom as the indented section is pressed into the recess.

22. A piston for an axial piston machine, comprising:
a piston body forming an axial cavity, and having a given specific gravity; and
a filler material inserted into and at least partially filling said cavity, and having a specific gravity less than said given specific gravity;
the filler material including
i) inner and outer opposite axial ends,
ii) an annular surface extending between said ends, and
iii) a recess extending inward from said annular surface at a location between said axial ends;
the piston body including
i) a tubular sidewall,
ii) a radially extending surface extending inward from the sidewall, and
iii) an indented section connected to and radially extending inward from the sidewall, the indented section being pressed into the recess of the filler material to fit in said recess in pressure engagement against the filler material to hold the filler material in the cavity of the piston body;
wherein the filler material forms
i) an axial lubricating passage axially extending inward from the outer end of the filler material to conduct a lubricant thereinto, and
ii) a radial lubricating passage extending outward from the axial lubricating passage and to the recess of the filler material to conduct the lubricant between the axial lubricating passage and said recess.

* * * * *